(12) United States Patent
Futamoto et al.

(10) Patent No.: US 6,562,453 B1
(45) Date of Patent: May 13, 2003

(54) PERPENDICULAR MAGNETIC RECORDING MEDIUM AND MAGNETIC RECORDING APPARATUS

(75) Inventors: Masaaki Futamoto, Shiroyama (JP); Yoshiyuki Hirayama, Kodaira (JP); Yukio Honda, Fuchu (JP); Atsushi Kikukawa, Higashimurayama (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/610,455

(22) Filed: Jul. 5, 2000

(30) Foreign Application Priority Data

Jun. 7, 1999 (JP) ............................ 11-191551

(51) Int. Cl.⁷ .............................. G11B 5/66; G11B 5/70; G11B 5/012; H01F 1/00
(52) U.S. Cl. ..................... 428/332; 428/336; 428/611; 428/694 TS; 428/694 TM; 428/900; 360/97.01
(58) Field of Search ................... 428/694 TM, 694 TS, 428/900, 694 TB, 336, 332, 611; 360/97.01

(56) References Cited

U.S. PATENT DOCUMENTS

| 4,707,756 A | * | 11/1987 | Futamoto et al. ........... 360/131 |
| 4,749,628 A | * | 6/1988 | Ahlert et al. ................ 428/660 |
| 5,789,069 A | * | 8/1998 | Araki et al. ................. 428/212 |

FOREIGN PATENT DOCUMENTS

| JP | 58-77025 | | 5/1983 |
| JP | 58-141435 | | 8/1983 |
| JP | 60-64413 | | 4/1985 |
| JP | 60-214417 | | 10/1985 |
| JP | 60-223029 A | * | 11/1985 |
| JP | 2000030236 A | * | 1/2000 |

* cited by examiner

Primary Examiner—Holly Rickman
(74) Attorney, Agent, or Firm—Kenyon & Kenyon

(57) ABSTRACT

To provide an improved perpendicular magnetic recording medium suitable for high density magnetic recording. In a perpendicular magnetic recording medium comprising a perpendicular magnetic layer and protective layer provided on a non-magnetic substrate via a soft magnetic backlayer, a polycrystalline MgO film is inserted between the soft magnetic backlayer and perpendicular magnetic layer.

9 Claims, 2 Drawing Sheets

PERPENDICULAR MAGNETIC RECORDING MEDIUM AND MAGNETIC RECORDING APPARATUS

BACKGROUND OF THE INVENTION

1. Field of the Invention

This invention relates to a magnetic recording medium comprising a magnetic layer suitable for high density magnetic recording, and to a magnetic recording apparatus using this medium.

2. Description of the Related Art

Magnetic disk apparatuses currently in use employ the in-plane magnetic recording method. In this method, there is a technical problem in forming an in-plane magnetic domain parallel to a substrate on an in-plane magnetic recording medium which is easily magnetized in a direction parallel to the disk substrate surface. In in-plane recording, as the magnetizations are adjacent to each other in mutually opposite directions, the thickness of the recording layer must decrease as the coercivity of the layer is increased so as to extend the linear recording density. Due to thermal fluctuations when the thickness of the recording layer decreases, the intensity of recorded magnetization decreases and in extreme cases, the recorded information may be lost. Also, in the in-plane recording method, if Co alloy is used for the recording layer as in the prior art, it is difficult to achieve an areal recording density of not less than 20 $Gb/in^2$.

In the perpendicular magnetic recording method, magnetizations are perpendicular to the surface of a film medium, so the magnetic recording principle and the mechanism whereby noise arises from the medium differs from the case of prior art in-plane magnetic recording media. Due to the fact that magnetizations are in complementary directions, this method is suitable for high density magnetic recording. It is therefore becoming more common and various structures have been proposed for media suitable for perpendicular magnetic recording. A method is presently been studied where a non-magnetic base material is provided between a perpendicular magnetized layer of Co alloy and a substrate to improve the perpendicular orientation characteristics of the perpendicular magnetized layer. For example, in JP-A No. S58-77025 and No. S58-141435, a method is disclosed for forming a Ti film as the base layer of a Co—Cr magnetic layer, in JP-A No. S60-214417, a method is disclosed using Ge or Si as the base layer, and in JP-A No. S60-064413, oxide base layer materials such as CoO and NiO are used.

These single-layered perpendicular magnetic recording media comprising a single perpendicular magnetic layer employ a thin film ring head for recording.

To improve the recording efficiency of perpendicular magnetic recording, it is effective to combine a single pole type of recording head with a perpendicular magnetic recording medium having two magnetic layers. A medium wherein a soft magnetic layer of permalloy or Co alloy is provided between the substrate and the perpendicular magnetic layer has been studied as an example of a bi-layered perpendicular magnetic recording medium. However, in bi-layered perpendicular magnetic recording media, the intensity of perpendicular magnetic anisotropy of the recording magnetic layer was inadequate compared to single-layered perpendicular magnetic recording media.

If a perpendicular magnetic recording medium is to achieve high density recording of 20 $Gb/in^2$ or more, the linear recording density resolution must be high, the noise due to the medium must be low, and recording must be performed efficiently by a thin film head. For this purpose, the perpendicular magnetic layer must have a fine magnetic crystal grain, the perpendicular magnetic anisotropy must be increased, and the recording magnetic field of the magnetic head must effectively penetrate inside the medium.

BRIEF SUMMARY OF THE INVENTION

It is therefore an object of this invention to provide a perpendicular magnetic recording medium which has high resolution so as to achieve a high recording density of 30 $Gb/in^2$, has low noise characteristics, and permits a high density magnetic recording apparatus to be easily constructed.

Perpendicular magnetic recording media which offer high recording efficiency by a magnetic head are bi-layered perpendicular magnetic recording media. According to this invention, to achieve the aforesaid object, a super-thin MgO film is introduced between a soft magnetic backlayer formed on a substrate and a Co alloy perpendicular magnetic layer having a hexagonal close-packed structure. To ensure that the object of this invention is achieved, a super-thin non-magnetic film of a special material is formed in the lower part and/or upper part of the MgO film.

The soft magnetic backlayer used in the bi-layered perpendicular magnetic recording medium is generally a polycrystalline film having a permalloy of Ni or the like as its main component, a polycrystalline film like Sendust having Fe as its main component, or a Co alloy such as Co—Nb—Zr. When the perpendicular magnetic layer of Co alloy is formed directly on this soft magnetic backlayer, in the initial growth state of the thin film, it contains an initial growth layer which is undesirable for a perpendicular magnetic layer wherein the crystal growth is random. As a result, there is a decrease of perpendicular magnetic anisotropy, and the magnetic separation between the magnetic crystal grains forming the perpendicular magnetic layer is insufficient, which leads to a decrease of coercivity or increase of noise.

The inventors found that the introduction of the super-thin film of MgO between the soft magnetic back layer and the perpendicular magnetic layer comprising Co alloy was effective in dealing with this problem. When the MgO film is formed on the soft magnetic backlayer having an amorphous structure, MgO microcrystalline grains are formed wherein the (100) plane is substantially parallel to the substrate, and as a result, a polycrystalline MgO oriented film grows wherein the (100) plane is essentially disposed parallel to the substrate. The (100) plane of MgO is energetically most stable crystallographic plane, and thus the (100) oriented MgO crystal grains tend to be formed when deposited on a flat surface. When a substrate has surface undulations, the (100) MgO plane has a slight misorientation, but substantially the (100) plane is almost parallel to the substrate surface. When the perpendicular magnetic layer of Co alloy is formed on this oriented film, magnetic crystal grains grow having a hexagonal close-packed structure with an easily magnetization [0001] axis perpendicular to the substrate, and perpendicular magnetic anisotropy therefore increases.

The thickness of the MgO film required to produce this effect is 1 nm or greater. If the thickness of the MgO film is made too large, the distance between the soft magnetic backlayer and perpendicular magnetic layer increases, so recording efficiency when recording is performed by a magnetic head decreases. The linear recording density required to achieve an areal recording density of 30 Gb/in$^2$ or more is at least 300 kFCI, and to increase the efficiency of the recording head at this high linear recording density, the gap between the two magnetic films must not exceed 20 nm.

Also, the crystal grains of the MgO film become larger the more the film thickness increases. The magnetic crystal grains which grow on these crystal grains are affected by the MgO crystal grain diameter. Hence the diameter of the crystal grains forming the magnetic film, which is the medium on which magnetic recording is performed at high density, must not exceed 20 nm but preferably does not exceed 15 nm, and it is preferable that the thickness of the MgO film is less than 13 nm.

When the soft magnetic backlayer has a polycrystalline structure, and even when it has an amorphous structure, it is effective to introduce a super-thin non-magnetic layer between the soft magnetic backlayer and MgO film to improve the (100) orientation characteristics of the MgO polycrystalline film. For this purpose a non-magnetic layer having an amorphous structure is particularly desirable. Materials which exhibit this desirable effect in the region when the film thickness does not exceed 10 nm are Ti, Zr, Hf, Cr, Mo, Nb, V, W, Si, Ge, B, C or alloys having these elements as their main component, or oxides chosen from the group $SiO_2$, $Al_2O_3$ and $ZrO_2$. If the MgO film is formed via the film of this non-magnetic material, its (100) orientation characteristics are largely improved.

The perpendicular magnetic layer of Co alloy may be formed on the (100) oriented MgO polycrystalline film, but to further promote noise reduction of the magnetic recording medium, it is effective to provide a super-thin non-magnetic layer having a hexagonal close-packed structure of several nm or less on the MgO film. By interposing this non-magnetic layer, the magnetic separation between magnetic crystals of the Co alloy perpendicular magnetic layer is particularly enhanced in the initial growth region. As both of these have the same hexagonal close-packed structure, epitaxial growth occurs wherein the crystal lattice grows continuously. This epitaxial growth is also effective in reducing crystal defects in the magnetic film and in achieving a desirable coercivity.

Examples of materials having a hexagonal close-packed structure with this effect are Co—Cr, Co—Cr—X (X=Mn, V, Zr, Hf, Nb, Mo, W, Si, B, Ta, Cu) where the addition amount of the non-magnetic element to Co exceeds 30 at %, or Ru, Ru—Y alloy (Y=Mn, Cr, Al, Cu), Ti, or Ti—Z alloy (Z=Co, Ni, Mn, Cu, Al).

In any case, for the magnetic recording medium to permit a recording density of 30 Gb/in$^2$, the distance between the soft magnetic backlayer and the perpendicular magnetic layer comprising Co must not exceed 20 nm. The thickness of the MgO film in this case is in the range 1 nm to 15 nm, but more preferably less than 13 nm. Further, the perpendicular magnetic layer comprising Co is formed on the (100) oriented polycrystalline MgO film directly or via a non-magnetic layer having a hexagonal close packed structure, but perpendicular magnetic layers having other crystalline structures may also be formed on the perpendicular magnetic layer if necessary.

DETAILED DESCRIPTION OF THE PREFERRED EMBODIMENTS

Some embodiments of this invention will now be described referring to the appended drawings.

[Embodiment 1]

Figure 1:
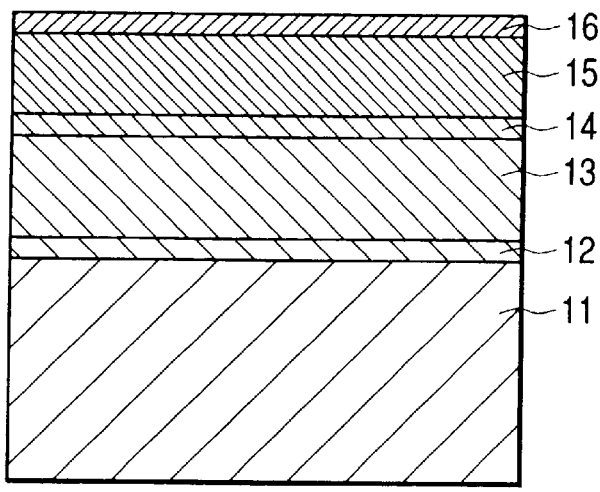
FIG. 1 is a cross-sectional schematic view of one example of a perpendicular magnetic recording medium according to this invention.

A perpendicular magnetic recording medium having the cross-sectional structure shown in FIG. 1 was fabricated by magnetron sputtering using a glass substrate of diameter 2.5 inch. After forming a layer 12 for strengthening the adhesion force on a substrate 11, a soft magnetic backlayer 13, MgO film 14, perpendicular magnetic layer 15 and protective layer 16 were formed. A Cr target was used for the layer 12 for strengthening adhesion force, a Co-8 at %Nb-4 at %Ta target was used for the soft layer 13, a MgO target was used for the MgO film 14, a Co-20 at %Cr-10 at %Pt-1.5 at %Ta target was used for the perpendicular magnetic layer 15, and a carbon target was used for the protective layer. The Cr film of 20 nm-thickness, the Co—Nb—Ta film of 200 nm-thickness, the MgO film of 10 nm-thickness, the Co—Cr—Pt—Ta perpendicular magnetic layer of 25 nm-thickness, and the carbon layer of 5 nm-thickness were formed respectively. An Ar gas pressure of 3 mTorr for sputtering, sputter power of 10 W/cm$^2$, and substrate temperature of 280° C. were used.

When the structure of this perpendicular magnetic recording medium was examined by a transmission electron microscope and X-ray diffraction, it was found that the MgO film was a (100) oriented film with an average crystal grain diameter of 8 nm, and the Co—Cr—Pt—Ta perpendicular magnetic layer grew epitaxially on the MgO crystal grains with the [0001] orientation as the preferred growth orientation.

As a comparison sample 1, the perpendicular magnetic recording medium was fabricated without an MgO film, and as a comparison sample 2, a single layer magnetic recording medium was fabricated without the soft magnetic backlayer.

A single pole type thin film head was used for recording on the bi-layered perpendicular magnetic recording medium, and a head having a gap length of 0.2 μm was used for recording on the single-layered perpendicular magnetic recording medium. A giant magneto-resistance (GMR) head having a head shield gap of 0.15 μm was used for reproduction, the spacing between the head and medium surface during measurements being 0.015 μm. To evaluate the characteristics, the recording resolution, reproduction output at low recording density, S/N of the medium and the magneto-motive force of the writing head required for saturation recording were measured. Recording resolution was measured by the output half recording density ($D_{50}$) which is half the low frequency reproduction output, reproduction output was measured by the value of the reproduction output relative to comparison sample 2 when recording was performed at 10 kFCI, and the S/N of the medium was measured by the value of S/N relative to comparison sample 2 when magnetic recording was performed at 300 kFCI. These results are shown in Table 1.

TABLE 1

| Sample | Resolution $D_{50}$ (kFC1) | Reproduction output (relative value) | S/N of medium (relative value) | Magneto-motive force of writing head (relative value) |
|---|---|---|---|---|
| This invention | 268 | 2.3 | 1.4 | 0.21 |
| Comparison sample 1 | 230 | 1.7 | 0.8 | 0.34 |
| Comparison sample 2 | 255 | 1.0 (Comparison value) | 1.0 (Comparison value) | 1.0 (Comparison value) |

The magnetic recording medium in this embodiment has a greatly improved recording resolution and medium S/N compared to comparison sample 1, and the low density reproduction output and writing head magneto-motive force are also largely improved compared to comparison sample 2.

A 2.5 inch magnetic recording apparatus was manufactured using the magnetic recording medium fabricated in this embodiment, and using a GMR head of track width 0.32 μm for recording with a single pole type thin film head of track width 0.4 μm as reproducing element. An error rate of $10^{-9}$ was obtained at an areal recording density of 30 Gb/in$^2$, and it was confirmed that the apparatus functions as a super high-density magnetic recording apparatus.

[Embodiment 2]

Figure 2:
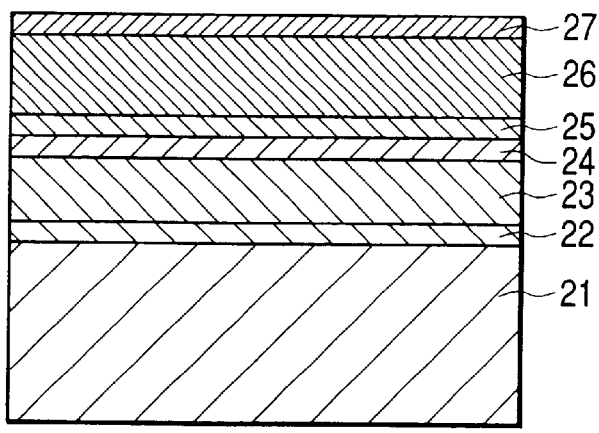
FIG. 2 is a cross-sectional schematic view of another example of a perpendicular magnetic recording medium according to this invention.

A perpendicular magnetic recording medium having the cross-sectional structure shown in FIG. 2 was fabricated by magnetron sputtering using a glass substrate of diameter 2.5 inch. After forming a layer 22 for strengthening the adhesion force on a substrate 21, a soft magnetic backlayer 23, seed layer 24, MgO film 25, perpendicular magnetic layer 26 and protective layer 27 were formed. A Zr target was used for the layer 22 for strengthening adhesion force, a Fe-8 at %Si-3 at %Al target was used for the soft layer 23, a Hf target was used for the seed layer 24, a MgO target was used for the MgO film 25, a Co-21 at %Cr-8 at %Pt-2 at %Nb target was used for the perpendicular magnetic layer 26, and a carbon target was used for the protective layer 27. The Zr film of 20 nm-thickness, the Fe—Si—Al film of 400 nm-thickness, the Hf film of 3 nm-thickness, the MgO film of 12 nm-thickness, the Co—Cr—Pt—Nb perpendicular magnetic layer of 25 nm-thickness, and the carbon layer of 5 nm-thickness were formed respectively. An Ar gas pressure of 3 mTorr for sputtering, sputter power of 10 W/cm$^2$, and substrate temperature of 300° C. were used.

When the structure of this perpendicular magnetic recording medium was examined by a transmission electron microscope and X-ray diffraction, it was found that the MgO film was a (100) oriented film with an average crystal grain diameter of 10 nm, and the Co—Cr—Pt—Nb perpendicular magnetic layer grew epitaxially on the MgO crystal grains with the [0001] orientation as the preferred growth orientation. Next, perpendicular magnetic recording media of identical structure were fabricated excepting that a Ti, Zr, Cr, Mo, Nb, V, W, Si, Ge, B, C, SiO$_2$, Al$_2$O$_3$ or ZrO$_2$ target was used to form the seed layer.

As a comparison sample, the perpendicular magnetic recording medium was fabricated under identical conditions without the MgO film. The recording and reproduction characteristics of these perpendicular magnetic recording media were measured under the following conditions. A single pole type thin film head was used for recording, and a great magnetic resistance (GMR) head having a head shield gap of 0.15 μm was used for reproduction, the spacing between the head and medium surface during measurements being 0.015 μm. To evaluate the characteristics, the recording resolution, reproduction output at low recording density and S/N of the medium were measured. Recording resolution was measured by the output half recording density ($D_{50}$) which is half the low frequency reproduction output, reproduction output was measured by the value of the reproduction output relative to the comparison sample when recording was performed at 10 kFCI, and the S/N of the medium was measured by the value of S/N relative to the comparison sample when magnetic recording was performed at 300 kFCI. These results are shown in Table 2.

TABLE 2

| Sample No. | Seed layer | Resolution ($D_{50}$k:FC1) | Reproduction output (relative value) | S/N of medium (relative value) |
|---|---|---|---|---|
| 1 | Hf | 265 | 1.6 | 1.3 |
| 2 | Ti | 255 | 1.5 | 1.5 |
| 3 | Zr | 275 | 1.4 | 1.4 |
| 4 | Cr | 251 | 1.8 | 1.3 |
| 5 | Mo | 245 | 1.5 | 1.4 |
| 6 | Nb | 251 | 1.6 | 1.6 |
| 7 | V | 261 | 1.5 | 1.4 |
| 8 | W | 244 | 1.9 | 1.3 |
| 9 | Si | 269 | 1.7 | 1.7 |
| 10 | Ge | 265 | 1.7 | 1.7 |
| 11 | B | 261 | 1.9 | 1.9 |
| 12 | C | 238 | 1.2 | 1.2 |
| 13 | SiO2 | 252 | 1.6 | 1.6 |
| 14 | Al2O3 | 250 | 1.5 | 1.5 |
| 15 | ZrO2 | 265 | 1.5 | 1.5 |
| Comparison Sample | Hf | 210 | 1.0 (Comparison reference) | 1.0 (Comparison reference) |

The magnetic recording medium in this embodiment shows greatly improved recording resolution and medium S/N compared to the comparison sample.

[Embodiment 3]

Figure 3:
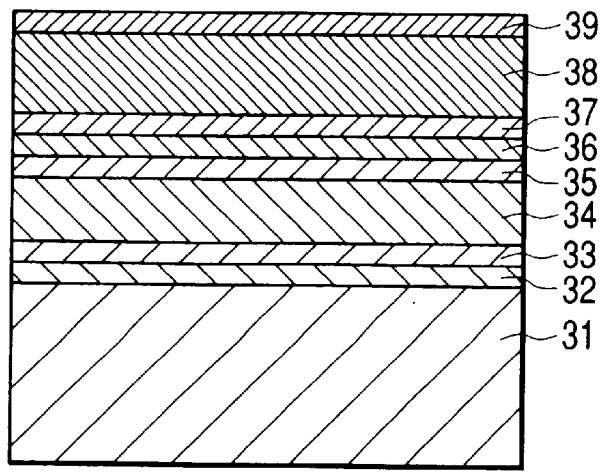
FIG. 3 is a cross-sectional schematic view of another example of a perpendicular magnetic recording medium according to this invention.

A perpendicular magnetic recording medium having the cross-sectional structure shown in FIG. 3 was fabricated by magnetron sputtering using a glass substrate of diameter 2.5 inch. After forming a layer 32 for strengthening the adhesion force on a substrate 31, a hard magnetic layer 33 and soft magnetic layer 34 as soft magnetic backlayer, seed layer 35, MgO film 36, non-magnetic film 37 of a material having a hexagonal close-packed structure, perpendicular magnetic layer 38 and protective layer 39 were formed. A Cr-10 at %Zr target was used for the layer 32 for strengthening adhesion force, a Fe-35 at %Pt target was used for the hard layer 33, a Ni-16 at %Fe-3 at %Mo target was used for the soft layer 34, a Ge-35 at %Si target was used for the seed layer 35, a MgO target was used for the MgO film 36, a Co-28 at %Cr-8 at %Mn target was used for the non-magnetic film 37 of material having a hexagonal close-packed structure, a Co-21 at %Cr-8 at %Pt-2 at %Nb target was used for the perpendicular magnetic layer 38, and a carbon target was used for the protective layer. The Cr—Zr film of 20 nm-thickness, the Fe—Pt film of 10 nm-thickness, the Ni—Fe—Mo film of 150 nm-thickness, the Ge—Si film of 5 nm-thickness, the MgO film of 8 nm-thickness, the Co—Cr—Mn film of 6 nm-thickness, the Co—Cr—Pt—Nb perpendicular magnetic layer of 25 nm-thickness, and the carbon layer of 5 nm-thickness were formed respectively. An Ar gas pressure of 3 mTorr for sputtering, sputter power of 10 W/cm$^2$, and substrate temperature of 300° C. were used.

When the structure of this perpendicular magnetic recording medium was examined by a transmission electron microscope and X-ray diffraction, it was found that the MgO film was a (100) oriented film with an average crystal grain diameter of 8.7 nm, and the Co—Cr—Pt—Nb perpendicular magnetic layer grew epitaxially on the MgO crystal grains via the non-magnetic film 37 of material having a hexagonal close-packed structure, with the [0001] orientation as the preferred growth orientation.

Next, perpendicular magnetic recording media of identical structure were fabricated excepting that a Co-33 at %Cr, Co-30 at %Cr-5 at %Mn, Co-30 at %Cr-4 at %V, Co-30 at %Cr-6 at %Zr, Co-30 at %Cr-4 at %Hf, Co-30 at %Cr-5 at %Nb, Co-30 at %Cr-2 at %Mo, Co-30 at %Cr-2 at %W, Co-30 at %Cr-2 at %Si, Co-30 at %Cr-3 at %B, Co-30 at %Cr-4 at %Ta, Co-30 at %Cr-6 at %Cu, Ru, Ru-10 at %Mn, Ru-4 at %Cr, Ru-3 at %Al, Ru-5 at %Cu, Ti or Ti-6 at %Mn target was used for the non-magnetic film of material having a hexagonal close-packed structure. As a comparison sample, a perpendicular magnetic recording medium, comprising the perpendicular magnetic layer 38 formed directly on the soft magnetic backlayer 34 without the seed layer 35, the MgO film 36, and the non-magnetic layer 37 of material having a hexagonal close-packed structure, was fabricated under identical conditions. The recording and reproduction characteristics of these perpendicular magnetic recording media were measured under the following conditions. A single pole type thin film head was used for recording, and a giant magneto-resistance (GMR) head having a head shield gap of 0.12 μm was used for reproduction, the spacing between the head and medium surface during measurements being 0.014 μm. To evaluate the characteristics, the recording resolution, reproduction output at low recording density and S/N of the medium were measured. Recording resolution was measured by the output half recording density ($D_{50}$) which is half the low frequency reproduction output, reproduction output was measured by the value of the reproduction output relative to the comparison sample when recording was performed at 10 kFCI, and the S/N of the medium was measured by the value of S/N relative to the comparison sample when magnetic recording was performed at 300 kFCI. These results are shown in Table 3.

TABLE 3

| Sample No. | Material having a hexagonal close-packed structure | Resolution ($D_{50}$:kFC1) | Reproduction output (relative value) | S/N of medium (relative value) |
| --- | --- | --- | --- | --- |
| 1 | Co-28 at % Cr-8 at % Mn | 261 | 1.6 | 1.9 |
| 2 | Co-33 at % Cr | 253 | 1.5 | 1.5 |
| 3 | Co-30 at % Cr-5 at % Mn | 247 | 1.4 | 1.9 |
| 4 | Co-30 at % Cr-4 at % V | 245 | 1.5 | 1.6 |
| 5 | Co-30 at % Cr-6 at % Zr | 245 | 1.5 | 1.4 |
| 6 | Co-30 at % Cr-4 at % Hf | 253 | 1.6 | 1.6 |
| 7 | Co-30 at % Cr-5 at % Nb | 241 | 1.5 | 1.7 |
| 8 | Co-30 at % Cr-2 at % Mo | 241 | 1.4 | 1.5 |
| 9 | Co-30 at % Cr-2 at % W | 260 | 1.3 | 1.6 |
| 10 | Co-30 at % Cr-2 at % Si | 255 | 1.3 | 1.8 |
| 11 | Co-30 at % Cr-3 at % B | 260 | 1.4 | 1.9 |
| 12 | Co-30 at % Cr-4 at % Ta | 248 | 1.2 | 1.7 |
| 13 | Co-30 at % Cr-6 at % Cu | 258 | 1.3 | 1.6 |
| 14 | Ru | 250 | 1.3 | 1.2 |
| 15 | Ru-10 at % Mn | 245 | 1.3 | 1.6 |
| 16 | Ru-4 at % Cr | 228 | 1.2 | 1.5 |
| 17 | Ru-3 at % Al | 235 | 1.2 | 1.6 |
| 18 | Ru-5 at % Cu | 249 | 1.3 | 1.5 |
| 19 | Ti | 240 | 1.1 | 1.3 |
| 20 | Ti-6 at % Mn | 238 | 1.4 | 1.6 |
| Comparison Sample | None | 210 | 1.0 (Comparison reference) | 1.0 (Comparison reference) |

The magnetic recording medium in this embodiment shows greatly improved recording resolution and medium S/N compared to the comparison sample.

Figure 4A:
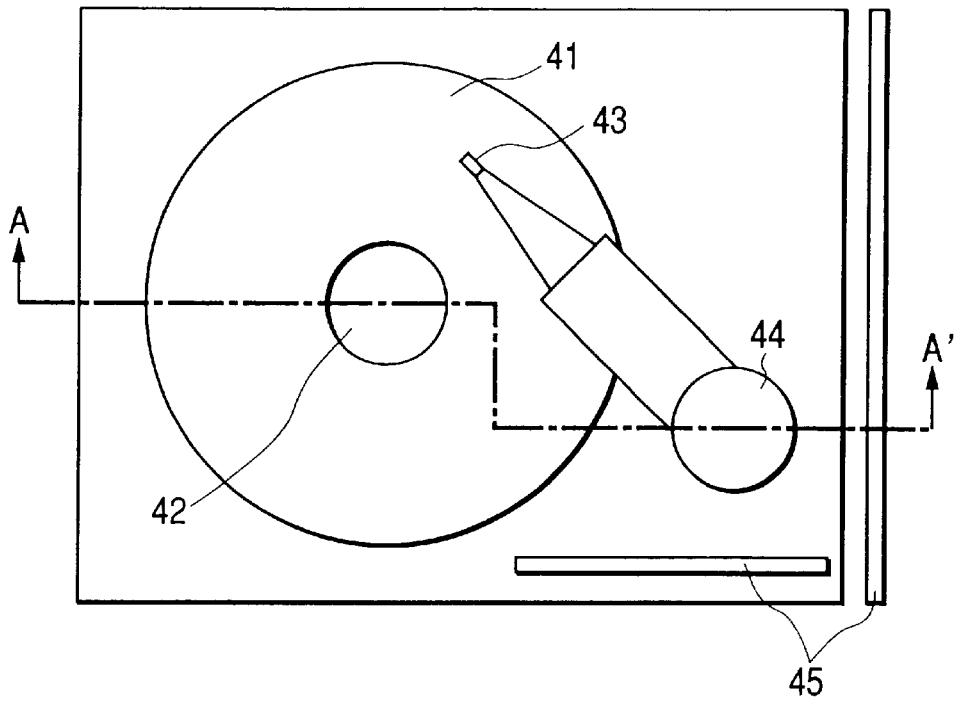
FIGS. 4(a) and 4(b) are outline views of the construction of a magnetic storage apparatus.
Figure 4B:
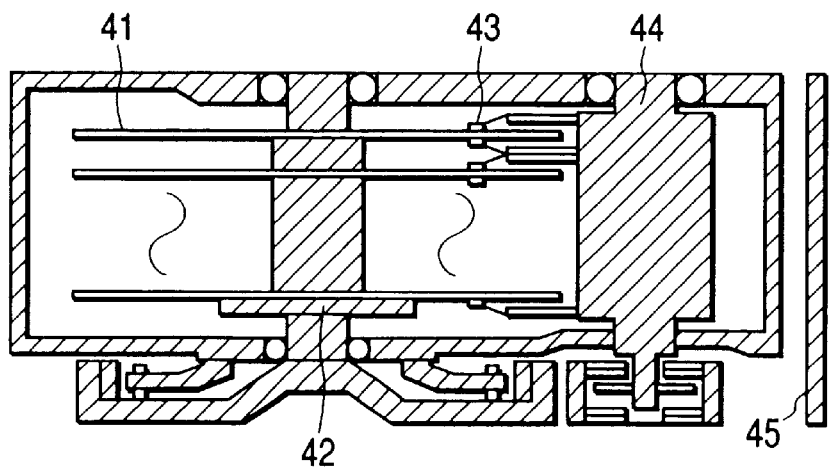

A magnetic storage device shown in FIG. 4 was fabricated using a recording/reproduction head having a high sensitivity reproduction element using the tunnel magneto-resistance (TMR) effect and a perpendicular magnetic recording medium of which a prototype was produced in Embodiment 3. This magnetic storage device is a device having a construction known in the art comprising a magnetic recording medium 41 rotation driven by a magnetic recording medium drive unit 42, a magnetic head 43 which performs recording and reproduction on the magnetic recording medium 41 when driven by a magnetic head drive unit 44, and a signal processor 45 which processes the recording signal and reproduction signal from the magnetic head 43, as shown by the schematic plan view in FIG. 4(a) and a section taken through a line AA' in FIG. 4(b).

The track width of the recording head was 0.3 μm, the track width of the TMR head element for reproduction was 0.26 μm and the spacing between the head and the medium was 15 nm. The EEPR4 system was used for signal processing, and when the apparatus was operated using a surface recording density of 55 Gb/in$^2$, an error rate of $10^{-8}$ or less was obtained.

According to this invention, the resolution of the perpendicular magnetic recording medium can be improved, noise can be reduced and a high S/N ratio is obtained, so a high density magnetic disk apparatus can be fabricated. In particular, high density magnetic recording of 30 Gb/in$^2$ can be performed, so the apparatus can be made compact and high capacity.

DESCRIPTION OF REFERENCE NUMERALS 11 substrate, 12 layer for strengthening adhesion force, 13 soft magnetic layer, 14 MgO film, 15 perpendicular magnetic layer, 16 protective layer, 21 substrate, 22 layer for strengthening adhesion force, 23 soft magnetic layer, 24 seed film, 25 MgO film, 26 perpendicular magnetic layer, 27 protective layer, 31 substrate, 32 layer for strengthening adhesion force, 33 hard magnetic layer, 34 soft magnetic layer, 35 seed film, 36 MgO film, 37 film of material having a hexagonal close-packed structure, 38 perpendicular magnetic layer, 39 protective layer, 41 magnetic recording medium, 42 magnetic recording medium drive unit, 43 magnetic head, 44 magnetic head drive unit, 45 signal processor.

What is claimed is:

1. A perpendicular magnetic recording medium wherein a perpendicular magnetic layer is provided on a non-magnetic substrate via a soft magnetic backlayer, wherein a polycrystalline MgO film is inserted between said soft magnetic backlayer and said perpendicular magnetic layer, and the perpendicular magnetic layer formed on said polycrystalline MgO film has a hexagonal close-packed structure, wherein a distance between a surface of said soft magnetic backlayer and said perpendicular magnetic layer is within 20 nm.

2. A perpendicular magnetic recording medium wherein a perpendicular magnetic layer is provided on a non-magnetic substrate via a soft magnetic backlayer, wherein a polycrystalline MgO film is provided on said soft magnetic backlayer, a non-magnetic layer having a hexagonal close-packed structure is provided on said polycrystalline MgO film, the perpendicular magnetic layer is provided on said non-magnetic layer, and said perpendicular magnetic layer has a hexagonal close-packed structure, wherein a distance between a surface of said soft magnetic backlayer and said perpendicular magnetic layer is within 20 nm.

3. A perpendicular magnetic recording medium according to claim 1, wherein a non-magnetic layer comprising a material comprising Ti, Zr, Hf, Cr, Mo, Nb, V, W, Si, Ge, B, C or alloys having these elements as their main component, or oxides selected from the group consisting of $SiO_2$, $Al_2O_3$ or $ZrO_2$, is provided between said soft magnetic backlayer and said polycrystalline MgO film.

4. A perpendicular magnetic recording medium according to claim 2, wherein a non-magnetic layer comprising a material comprising Ti, Zr, Hf, Cr, Mo, Nb, V, W, Si, Ge, B, C or alloys having these elements as their main component, or oxides selected from the group consisting of $SiO_2$, $Al_2O_3$ or $ZrO_2$, is provided between said soft magnetic backlayer and said polycrystalline MgO film.

5. A perpendicular magnetic recording medium according to claim 2, wherein the thickness of said polycrystalline MgO film is from 1 nm to less than 13 nm.

6. A perpendicular magnetic recording medium according to claim 3, wherein the total film thickness of the non-magnetic layer formed between said soft magnetic backlayer and said perpendicular magnetic layer is from 2 nm to less than 20 nm, and the thickness of said polycrystalline MgO film is from 1 nm to less than 13 nm.

7. A magnetic recording apparatus comprising a magnetic recording medium, a magnetic recording medium drive unit which drives said magnetic recording medium, a magnetic head which performs recording and reproduction on said magnetic recording medium, a magnetic head drive unit which drives said magnetic head, and a recording/reproduction signal processing system which processes recording signals and reproduction signals sent to and from said magnetic head, wherein said magnetic recording medium comprises a soft magnetic backlayer provided on a non-magnetic substrate, a polycrystalline MgO film formed on said soft magnetic backlayer, and a perpendicular magnetic layer having a hexagonal close-packed structure provided on said polycrystalline MgO film, said magnetic head is provided with a thin film recording head part and a reproduction element using the giant magneto-resistance effect or magnetic tunnel effect, and said apparatus performs magnetic recording and reproduction at an areal recording density of at least 30 Gb/in$^2$.

8. A magnetic recording apparatus comprising a magnetic recording medium, a magnetic recording medium drive unit which drives said magnetic recording medium, a magnetic head which performs recording and reproduction on said magnetic recording medium, a magnetic head drive unit which drives said magnetic head, and a recording/reproduction signal processing system which processes recording signals and reproduction signals sent to and from said magnetic head, wherein said magnetic recording medium comprises a soft magnetic backlayer provided on a non-magnetic substrate, a polycrystalline MgO film provided on said soft magnetic backlayer, a non-magnetic layer having a hexagonal close-packed structure provided on said polycrystalline MgO film and a perpendicular magnetic layer having a hexagonal close-packed structure provided on said non-magnetic layer, said magnetic head is provided with a thin film recording head part and a reproduction element using the giant magnetic resistance effect or magnetic tunnel effect, and said apparatus performs magnetic recording and reproduction at an areal recording density of at least 30 Gb/in$^2$.

9. A magnetic recording apparatus comprising a magnetic recording medium, a magnetic recording medium drive unit which drives said magnetic recording medium, a magnetic head which performs recording and reproduction on said magnetic recording medium, a magnetic head drive unit which drives said magnetic head, and a recording/reproduction signal processing system which processes recording signals and reproduction signals sent to and from said magnetic head, wherein said magnetic recording medium comprises a soft magnetic backlayer provided on a non-magnetic substrate, an non-magnetic layer comprising a material comprising Ti, Zr, Hf, Cr, Mo, Nb, V, W, Si, Ge, B, C or alloys having these elements as their main component, or oxides selected from the group consisting of $SiO_2$, $Al_2O_3$ or $ZrO_2$, provided on said soft magnetic backlayer, a polycrystalline MgO film provided on said non-magnetic layer, a non-magnetic layer having a hexagonal close-packed structure provided on said polycrystalline MgO film and a perpendicular magnetic layer having a hexagonal close-packed structure provided on said non-magnetic layer, said magnetic head is provided with a thin film recording head part and a reproduction element using the giant magnetic resistance effect or magnetic tunnel effect, and said apparatus performs magnetic recording and reproduction at an areal recording density of at least 30 Gb/in$^2$.

\* \* \* \* \*